US 6,640,262 B1

(12) United States Patent
Uppunda et al.

(10) Patent No.: US 6,640,262 B1
(45) Date of Patent: Oct. 28, 2003

(54) METHOD AND APPARATUS FOR AUTOMATICALLY CONFIGURING A CONFIGURABLE INTEGRATED CIRCUIT

(75) Inventors: Krishna Uppunda, Santa Clara, CA (US); Eric R. Davis, Sunnyvale, CA (US); Nathaniel Henderson, San Jose, CA (US); Chi-Lie Wang, Sunnyvale, CA (US); Alexander Herrera, Austin, TX (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/467,724

(22) Filed: Dec. 20, 1999

(51) Int. Cl.[7] .......................................... G06F 15/177
(52) U.S. Cl. ................ 710/10; 710/1; 710/3; 710/7; 710/13; 710/20; 710/23; 710/33; 710/52
(58) Field of Search .............. 710/1, 3, 7, 10, 710/13, 20, 23, 33, 52

(56) References Cited

U.S. PATENT DOCUMENTS 4,420,821 A * 12/1983 Hoffman ................ 365/185.08
5,812,867 A * 9/1998 Basset .......................... 712/1
6,064,593 A * 5/2000 Matsubara et al. ..... 365/185.11
6,215,689 B1 * 4/2001 Chhor et al. ................. 365/63

* cited by examiner

Primary Examiner—Kim Huynh
Assistant Examiner—Mohammad O. Farooq
(74) Attorney, Agent, or Firm—McDonnell Boehnen Hulbert & Berghoff

(57) ABSTRACT

A method and apparatus for automatically configuring a configurable integrated circuit. One embodiment comprises a method for automatically loading data including configuration data to a configurable integrated circuit upon initialization of a system in which the configurable integrated circuit is embedded. The method of one embodiment comprises storing a plurality of commands and a plurality of data elements in a non-volatile memory of the system. The method further comprises reading contents of an initial address in the non-volatile memory. If the initial address contains a command, depending upon a type of the command, the method comprises writing contents of a next address in the non-volatile memory to a register space of the configurable integrated circuit, to a configuration space of the configurable integrated circuit, or to a command space of the configurable integrated circuit.

20 Claims, 5 Drawing Sheets

| | |
|---|---|
| Reg Write Cmd | 0 |
| Data | 1 |
| Reg Write Cmd | 2 |
| Data | 3 |
| PCI Config Write Cmd | 4 |
| Data | 5 |
| Reg Write Cmd | 6 |
| Data | 7 |
| AutoInit Done Cmd | 8 |
| X | 9 |
| X | 10 |
| X | 11 |

FIG. 3

METHOD AND APPARATUS FOR AUTOMATICALLY CONFIGURING A CONFIGURABLE INTEGRATED CIRCUIT

FIELD OF THE INVENTION

The invention is in the field of configuring integrated circuit devices to perform particular functions.

BACKGROUND OF THE INVENTION

In electronic systems, various system functions are typically performed by specific circuits. The specific circuits may be integrated circuit chips manufactured to perform the specific function. For example, digital signal processor (DSP) chips can be purchased to process digital signals. Various kinds of DSP chips can be purchased to fill particular needs. Some functions, however, are too complex or varied for a manufacturer to supply off-the-shelf circuits for each possible variation of the function. For example, a circuit for controlling all communication between a network and a personal computer (PC) would have to be configured for the particular PC, the particular network, and also for optional capabilities. One response to the challenge of designing integrated circuits for complex, varied and changeable applications is to produce integrated circuits that are designed for a particular type of function, yet have some programmability to make them more flexible. One example is application specific integrated circuits (ASICs). An ASIC is an integrated circuit designed to perform a particular function by defining the interconnection of a set of basic circuit building blocks drawn from a library provided by the circuit manufacturer.

ASICs include registers that may be loaded with data that affects the behavior of the circuit. ASICs are usually configured by a skilled person "manually" loading specific registers so that the circuit will perform its intended function precisely as required, for example, by particular types of hardware with which it will interact. An ASIC may have some capability to be automatically configured by circuitry that loads data into registers of the ASIC from some source location. One method of configuring an ASIC embedded in a larger system is to store the configuration data in a non-volatile storage device, such as an electrically erasable programmable read only memory (EEPROM), and retrieve it when the system is initialized. This configuration data is traditionally in some fixed format and each location represents specific information about the device. Each time the system is initialized, the configuration registers of the ASIC are loaded with the data from the EEPROM. The source location in the EEPROM is "hardwired" to the ASIC registers. Typically, read and write pulses are sent to the serial EEPROM to read out each location in turn and write the contents to a corresponding register in the ASIC. This requires the ASIC to "know" what each location in the EEPROM represents. A disadvantage of this scheme is that it is very difficult to adapt the ASIC to different applications while embedded in the same or a similar system. For example, if it is desired to load a particular set of ASIC registers that are not supported by the EEPROM it is necessary to make hardware changes to provide the required support. In practice this usually involves replacing the ASIC altogether. Also, the addition of new register loads from the EEPROM dramatically increases the number of gates, and hence the semiconductor area, in the ASIC. This limits the ability of the ASIC to be configured automatically for any unforeseen application.

SUMMARY OF THE DISCLOSURE

A method and apparatus for automatically configuring a configurable integrated circuit is described. One embodiment comprises a method for automatically loading data including configuration data to a configurable integrated circuit upon initialization of a system in which the configurable integrated circuit is embedded. The method of one embodiment comprises storing a plurality of commands and a plurality of data elements in a non-volatile memory of the system. The method further comprises reading contents of an initial address in the non-volatile memory. If the initial address contains a command, depending upon a type of the command, the method comprises writing contents of a next address in the non-volatile memory to a register space of the configurable integrated circuit, to a configuration space of the configurable integrated circuit, or to a command space of the configurable integrated circuit.

In one embodiment, a network interface card in a network device, such as a personal computer (PC), is configured by automatically writing data in input/output (I/O) registers, configuration registers, and command registers each time the network device is initialized. In one embodiment, a programmable memory device, such as an electrically erasable programmable read only memory (EEPROM), is loaded with commands and data. Commands and register addresses are read from the EEPROM by a state machine when the network device is initialized. Data is also read from the EEPROM and written to registers of the network device as specified by the commands. In this way, the network interface card can be reconfigured merely by writing additional or different commands, register addresses and data into the EEPROM.

BRIEF DESCRIPTION OF THE DRAWINGS

FIG. 3 is a block diagram of a serial electrically erasable programmable read only memory (EEPROM).

DETAILED DESCRIPTION

Various embodiments of the invention are described below. First, a system view of one embodiment is described in which the invention is part of a device in a network. Then, an embodiment of the invention as a method and apparatus for automatically configuring a network interface card (NIC) upon initialization of the network device that uses the NIC is described.

Figure 1:
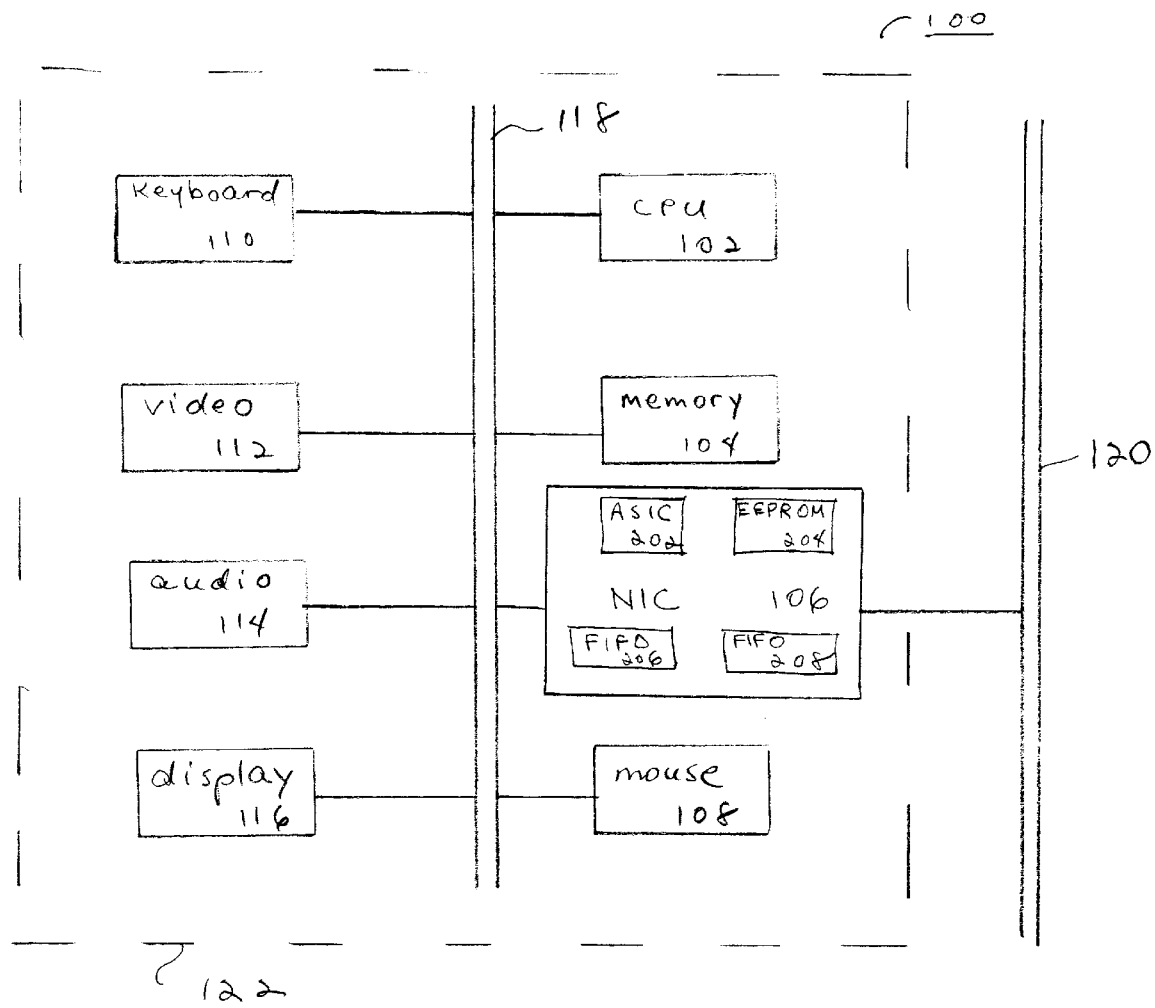
FIG. 1 is a block diagram of a portion of a network.

FIG. 1 is a block diagram of a portion of a network 100. Network 100 in various embodiments, may be a wide area network (WAN), a local area network (LAN), or any other collection of electronic devices that communicate via a physical or non-physical signal carrier. The network 100 has a physical network signal carrier 120. Other embodiments may use satellite or radio frequency signal transmission. In the network 100, any network protocol may be used. For example, transmission protocol over internet protocol (TCP/IP), Ethernet protocol, asynchronous transfer mode (ATM), integrated services digital network (ISDN), and digital subscriber line (DSL) may all be used.

Network signal carrier 120 connects multiple network devices. For simplicity, only one network device, personal computer (PC) 122, is shown in FIG. 1. PC 122 includes a central processing unit (CPU) 102 and a memory 104. PC 122 also includes several peripheral devices, such as keyboard 110, video card 112, audio card 114, display device 116 and mouse 108. The CPU 102, memory 104 and all peripheral devices communicate via bus 118. The bus 118 may be any type of PC bus according to a specific architecture. In one embodiment, the bus 118 is a peripheral component interconnect (PCI) bus. The PC 122 further includes a network interface card (NIC) 106 that is connected to the PCI bus 118 and to the network signal carrier 120. The NIC 106 includes circuitry for controlling communication between the PC 122 and any other entity on the network 100. The circuitry includes application specific integrated circuit (ASIC) 202, serial electrically erasable programmable read only memory (EEPROM) 204, receive first-in-first-out buffer (FIFO) 206, and transmit FIFO 208. In other embodiments, NIC 106 could be external to the PC 122 or it may reside on a different bus than PCI bus 118. For example, in other embodiments with different bus architectures, PC 122 may include a video bus for the video card 112 and a network bus for the NIC 106.

Figure 2:
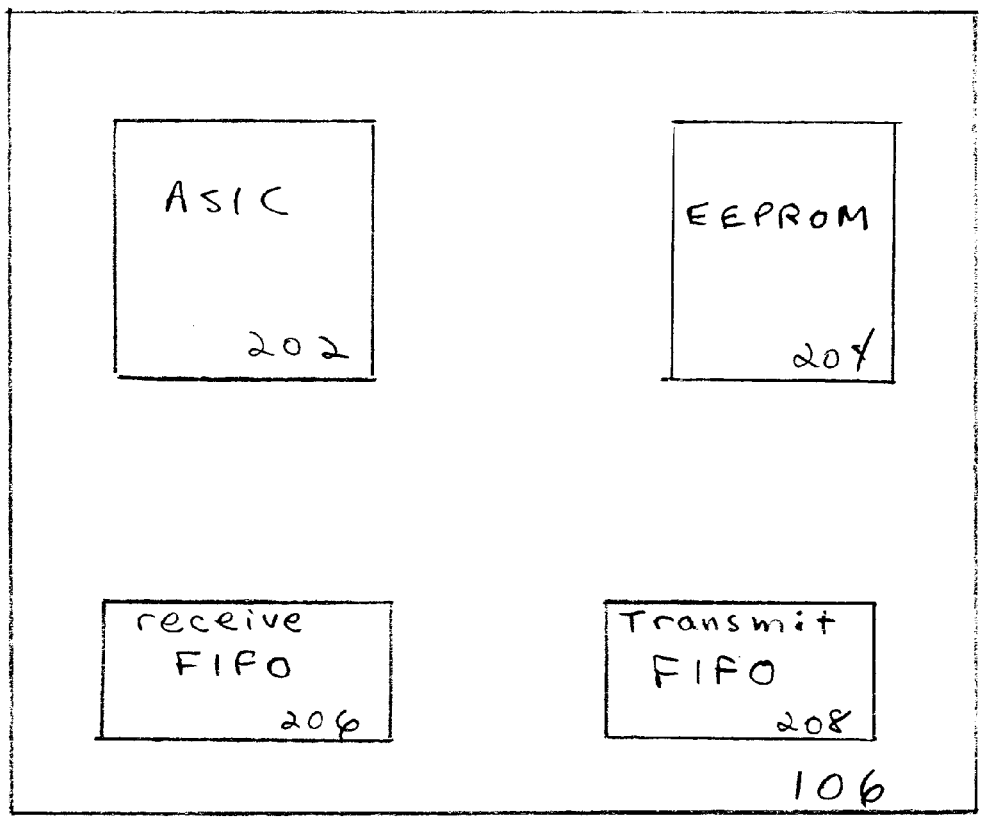
FIG. 2 is a block diagram of a network interface controller.

FIG. 2 is a block diagram of the NIC 106. Receive FIFO 206 temporarily stores incoming data received from other devices on the network 100. Transmit FIFO 208 temporarily stores data that is to be transmitted onto the network from the PC 122.

ASIC 202 includes circuitry that controls the operation of the NIC 106. ASIC 202 is designed to control communications between the network signal carrier 120 and the PC 122 for the particular architecture of PC 122 and the particular network protocol used in the network 100. ASIC 202 has a degree of flexibility in its operation. Some data may be loaded into registers of the ASIC 202 to change its operation. A certain number of registers are available for input/output (I/O) data, configuration data and command data. The data in particular registers is used by the ASIC 202 to perform its communication control functions. Changing the value of the data will change the behavior of the ASIC 202. According to the present invention, the ASIC 202 is made more flexible by enabling the values of I/O data, configuration data and command data to be easily changed on initialization of the PC 122. In other embodiments, the circuitry of the ASIC 202, the memory comprised in the EEPROM 204 and the FIFOs 206 and 208 may be part of one integrated circuit or may be divided up variously among different integrated circuits.

In one embodiment, I/O data, configuration data, and command data is stored in the EEPROM 204. Whenever the PC 122 is initialized, ASIC 202 automatically loads the configuration data from the EEPROM 204 to the ASIC 202. In one embodiment, a state machine in the ASIC 202 controls the loading of configuration data. In other embodiments, the state machine may reside in other elements of the NIC 106 (not shown), or even apart from the NIC 106. In contrast to traditional schemes, the EEPROM 204 stores both commands and data. The commands indicate what type of data is to follow in the EEPROM and also indicate an address in the ASIC in which the data should be stored. The EEPROM addresses are not "hardwired" to corresponding ASIC addresses and therefore the ASIC can be flexibly configured. To change the configuration of the ASIC, it is merely necessary to reprogram the EEPROM. In other embodiments, the programmable memory function performed by the EEPROM 204 may be performed by any other type of nonvolatile memory whose contents may be changed, such as battery backed random access memory (RAM).

FIG. 3 is an example of data stored in EEPROM 204. The first address (0) in the EEPROM 204 corresponds to an I/O register write ("Reg Write") command which includes the I/O space register address in the ASIC 202. The next address (1) in the EEPROM 204 is the data to be written to the I/O register address specified in address 0. Similarly, addresses (3) and (7) of the EEPROM 204 correspond to data to be written to the I/O register address specified in address (2) and address (6) respectively. Address (5) of the EEPROM 204 corresponds to data to be written to the peripheral component interface configuration ("PCI Config") address specified in address (4). Address (8) of the EEPROM 204 contains an automatic initialization done ("AutoInitDone") command which indicates the end of the EEPROM 204 initialization. All addresses in the EEPROM after (8) are shown as "don't cares". In various embodiments, the addresses subsequent to address 8 may contain additional commands and data to be loaded to the ASIC 202, or may be used for any other purpose.

The command format of one embodiment is illustrated below.

[15:13] Encoded Command

111-AutoInitDone: EEPROM has completed initialization

110-Reserved for future expansion

101-PCI Configuration Space Write

100-Reserved for future expansion

011-I/O Register Write

010-Reserved for future expansion

001-Reserved for future expansion

000-Reserved for future expansion

[12] Byte/Word Access

0-Byte

1-Word

[11] Reserved for future expansion

[10:0] Register address within the ASIC

The most significant three bits [15:13] indicate the encoded command as shown in the command format above. The encoded command can be a I/O register write, a PCI configuration space write, an ASIC command space write, or it could be an AutoInitDone command which indicates the end of EEPROM 204 initialization. The next bit [12] indicates whether a byte or word is being written. Bits [10:0] indicate the register address in the ASIC 202. The word following the command is the data to be written to the specified location.

Figure 4:
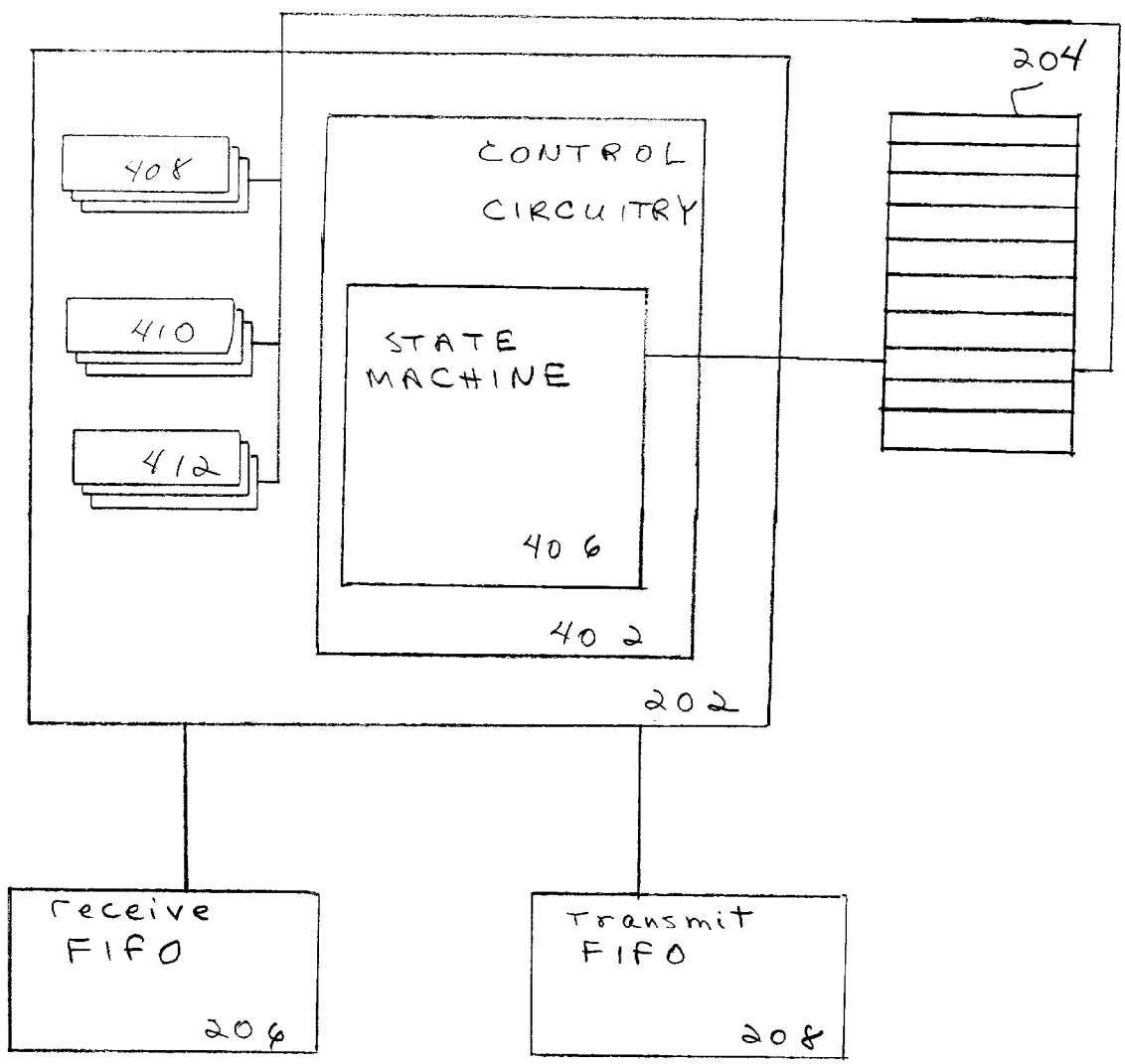
FIG. 4 is a block diagram of network interface controller control circuitry.

FIG. 4 is a block diagram of ASIC 202 showing control circuitry 402 and state machine 406. State machine 406 is coupled to EEPROM 204 for generating read and write pulses to read and write information from the EEPROM 204. The EEPROM 204 is coupled to the I/O registers 408, the configuration registers 410, and the command registers 412 for writing information to the respective registers from the EEPROM 204.

Figure 5:
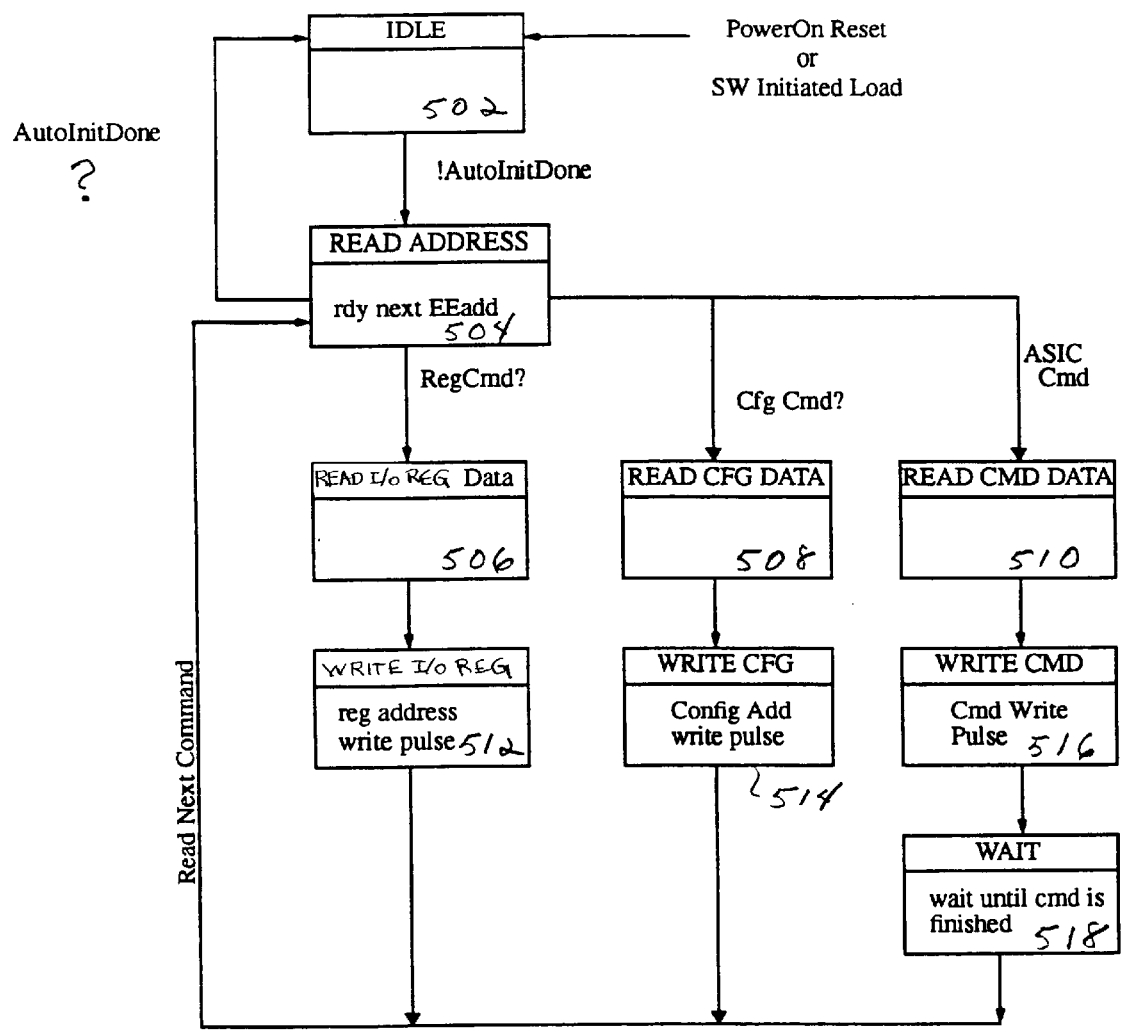
FIG. 5 is an illustration of a state machine of the network interface controller control circuitry.

FIG. 5 is an illustration of one embodiment of the state machine 406. State 502 is an idle state that is automatically entered on power up of the PC 122. AutoInitDone is tested in state 502. If AutoInitDone is true, then the EEPROM 204 initialization is complete and the state machine 406 remains in idle state 502. If AutoInitDone is not true then the state machine 406 enters the read address state 504. A command word is read from EEPROM 204 and tested to see if it is an I/O register command, a configuration command, an ASIC command or an AutoInitDone command. If the command is an AutoInitDone command, then idle state 502 is entered. If the command is an I/O register command, then read I/O register data state 506 is entered. If the command is a configuration command, then read configuration data state 508 is entered. If the command is an ASIC command, then read command data state 510 is entered.

In the read I/O register data state 506, the I/O data word is read from the EEPROM 204 and the state machine 406 transitions to the write I/O register address state 512. In the read configuration data state 508, the configuration data is read from the EEPROM 204 and the state machine transitions to the write configuration address state 514. In the read command data state 508, the command data is read from the EEPROM 204 and the state machine 406 transitions to the write command address state 516.

In the write register address state 512, the data word read in the read I/O register data state 506 is written to the address acquired in the read address state 504. The state machine 406 then enters the read address state 504.

In the write configuration address state 514, the data word read in the read configuration data state 508 is written to the address acquired in the read address state 504. The state machine 406 then enters the read address state 504.

In the write command address state 516, the data word read in the read command data state 510 is written to the address acquired in the read address state 504. A command write pulse is generated and the state machine 406 then enters the wait state 518 until the ASIC command has finished executing. The state machine 406 then enters the read address state 504.

According to the described embodiments, it is possible to easily reconfigure a NIC by merely entering additional or different NIC register addresses and data in the EEPROM 204. This is an advance over the prior art, in which reconfiguration of the NIC requires hardware solutions such as replacing the ASIC 202 and dramatically increasing the number of gates on the ASIC 202 to support additional register loads from the EEPROM 204.

A method and apparatus for automatically configuring a configurable integrated circuit has been described with reference to particular embodiments shown in the figures. Other embodiments may be envisioned by one of ordinary skill in the art. For example, the invention is applicable to any device that may be configured by loading data to registers in the device whether or not the device is part of a network. One of ordinary skill in the art may make modifications to the embodiments without departing from the scope of the invention as set forth in the following claims.

What is claimed is:

1. A method for automatically configuring a configurable integrated circuit embedded in a system, comprising:

storing a plurality of commands in a non-volatile memory of the system, wherein the plurality of commands include a data type and a storage location for a data element;

storing a plurality of data elements in the non-volatile memory, wherein the plurality of data elements comprise configuration data and command data for the configurable integrated circuit;

reading contents of an initial address in the non-volatile memory; and if the initial address contains a command, depending upon a type of command, writing contents of a next address in the non-volatile memory to a register space of the configurable integrated circuit, to a configuration space of the configurable integrated circuit, or to a command space of the configurable integrated circuit.

2. The method of claim 1, wherein each of the plurality of commands comprises:

a command type field containing a command type;

a byte/word field containing an indication of a data size; and an address field containing an address of a register in the non-volatile memory.

3. The method of claim 2, further comprising:

if the command type is "register command", reading I/O register data from the next address and writing the I/O register data to an address contained in the address field;

if the command type is "configuration command", reading configuration data from the next address and writing the configuration data to the address contained in the address field; and if the command type is "command", reading command data from the next address and writing the command data to the address contained in the address field.

4. The method of claims 3, further comprising:

after writing the command data to the address, waiting for a command indicated by the command data to complete; and reading a subsequent address of the non-volatile memory.

5. The method of claim 4, wherein the system is a network personal computer (PC), and the configurable integrated circuit is an application specific integrated circuit (ASIC) for controlling a network interface card (NIC).

6. The method of claim 5, wherein the non-volatile memory is a serial electrically erasable read only memory (EPROM).

7. The method of claim 6, wherein the automatic configuration occurs each time the PC is initialized.

8. An apparatus for automatically loading register, configuration, and command data to a configurable network interface controller (NIC), comprising:

a serial electrically erasable programmable read only memory (EEPROM) that stores commands and data, wherein the commands include a data type and a storage location for the data; and a control circuit comprising a state machine coupled to the EEPROM, wherein the state machine generates a read signal to read contents of EEPROM addresses; and a plurality of registers in the NIC comprising data registers, configuration registers, and command registers, wherein the control circuit reads a command from an address of the EEPROM, wherein the command indicates which of the plurality of registers in the NIC particular data must be written to.

9. The apparatus of claim 8, wherein the particular data is stored in at least one address of the EEPROM subsequent to the address containing the command read by the control circuit.

10. The apparatus of claim 9, wherein the control circuit comprises an electrically erasable programmable read only memory coupled to a peripheral component interface (PCI) bus of a personal computer (PC).

11. A network computer system, comprising:

at least one network router device coupled to the network signal carrier;

a plurality of network devices comprising a personal computer (PC) coupled to a network signal carrier, wherein the PC comprises, a processor;

a plurality of peripheral devices coupled to the processor through a bus;

a network interface controller (NIC) coupled to the bus and to the network signal carrier, the NIC comprising, control circuitry for controlling communication between the PC and other network devices;

a non-volatile memory device that stores command words and register, configuration, and command data for the control circuitry, wherein the command words include a data type and a storage location for the data, wherein the register, configuration and command data is automatically loaded to the control circuitry as indicated by the command words each time the PC is initalized.

12. The network computer system of claim 11, wherein the control circuitry comprises an application specific integrated circuit (ASIC) comprising data registers, configuration registers, and command registers.

13. The network computer system of claim 11, wherein the non-volatile memory comprises an electrically erasable programmable read only memory (EEPROM), and wherein the register, configuration, and command data is read from the EEPROM and written to respective registers of the control circuitry as indicated by the command words stored in the EEPROM proceeding the register, configuration, and command data.

14. An apparatus for automatically configuring a configurable integrated circuit embedded in a system, comprising:

means for storing a plurality of commands in a non-volatile memory of the system, wherein the plurality of commands include a data type and a storage location for a data element;

means for storing a plurality of data elements in the non-volatile memory, wherein the plurality of data elements comprise configuration data and command data for the configurable integrated circuit;

means for reading contents of an initial address in the non-volatile memory; and if the initial address contains a command, means for writing contents of a next address in the non-volable memory to a register space of the configurable integrated circuit, to a configuration space of the configurable integrated circuit, or to a command space of the configurable integrated circuit, depending upon a type of the command.

15. The apparatus of claim 14, wherein each of the plurality of commands comprises:

a command type field containing a command type;

a byte/word field containing an indication of a data size; and an address field containing an address of a register in the non-volatile memory.

16. A network interface card (NIC) comprising:

control circuitry for controlling communication between one network device and other network devices; and a non-volatile memory device that stores command words and register, configuration, and command data for the control circuitry, wherein the command words include a data type and a storage location for the data, wherein the register, configuration and command data is automatically loaded to the control circuitry as indicated by the command words each time the one network device is initialized.

17. The NIC of claim 16, wherein the control circuitry comprises an application specific integrated circuit (ASIC) comprising input/output (I/O) data registers, configuration registers, and command registers.

18. The NIC of claim 16, wherein the non-volatile memory comprises an electrically erasable programmable read only memory (EEPROM), and wherein the register, configuration, and command data is read from the EEPROM and written to respective registers of the control circuitry as indicated by the command words stored in the EEPROM proceeding the register, configuration, and command data.

19. A method for automatically configuring a network interface card (NIC), comprising:

storing a plurality of commands in a non-volatile memory of the NIC, wherein the plurality of commands include a data type and a storage location for a data element;

storing a plurality of data elements in the non-volatile memory, wherein the plurality of data elements comprise configuration data and command data for the NIC;

reading contents of an initial address in the non-volable memory; and if the initial address contains a command, depending upon a type of command, writing contents of a next address in the non-volable memory to a register space of the NIC, to a configuration space of the NIC, or to a command space of the NIC.

20. The method of claim 19, wherein each of the plurality of commands comprises:

a command type field containing a command type;

a byte/word field containing an indication of a data size; and an address field containing an address of a register in the non-volatile memory.

* * * * *